US 6,626,604 B1

(12) United States Patent
Pinarello

(10) Patent No.: US 6,626,604 B1
(45) Date of Patent: Sep. 30, 2003

(54) BICYCLE CONNECTING ELEMENT, PARTICULARLY FOR CONNECTING CARBON REAR FORKS TO FRAMES

(75) Inventor: Fausto Pinarello, Villorba (IT)

(73) Assignee: Cicli Pinarello S.r.l., Villorba (IT)

( * ) Notice: Subject to any disclaimer, the term of this patent is extended or adjusted under 35 U.S.C. 154(b) by 0 days.

(21) Appl. No.: 09/869,652
(22) PCT Filed: Nov. 20, 2000
(86) PCT No.: PCT/EP00/11523
§ 371 (c)(1),
(2), (4) Date: Jul. 2, 2001
(87) PCT Pub. No.: WO01/38164
PCT Pub. Date: May 31, 2001

(30) Foreign Application Priority Data

Nov. 26, 1999 (IT) .......................................... TV99A0131

(51) Int. Cl.[7] ................................................. F16B 9/00
(52) U.S. Cl. ........................ 403/196; 403/192; 403/362; 403/374.1; 403/374.3; 403/379.3; 403/379.4; 280/287; 280/288; 280/278
(58) Field of Search ........................... 403/374.3, 374.1, 403/374.2, 374.4, 187, 188, 192, 194, 196, 370, 373, 270–272, 368, 378, 379.3, 379.4, 379.6, 379.1, 379.2, 361, 362, 367, 16; 280/288, 278, 287, 281.1; 411/26, 27, 28; 279/2.1, 2.11

(56) References Cited

U.S. PATENT DOCUMENTS

| 2,746,769 | A | * | 5/1956 | Hoogendoorn ............... 280/287 |
| 3,074,589 | A | * | 1/1963 | Chaney ....................... 220/327 |
| 3,854,831 | A | * | 12/1974 | Gutner ........................ 403/292 |
| 3,876,231 | A | * | 4/1975 | Geisel ......................... 280/278 |
| 4,573,824 | A | * | 3/1986 | Ehle ............................ 403/322 |
| 5,059,057 | A | | 10/1991 | Graef |
| 5,129,666 | A | | 7/1992 | Lai |
| 5,346,237 | A | | 9/1994 | Wang |

FOREIGN PATENT DOCUMENTS

| DE | 39 16987 | * 11/1990 | ............... 280/281.1 |
| EP | A-0 812 761 | 12/1997 | |
| EP | 812 761 | * 12/1997 | ........... B62K/25/04 |
| FR | A-1 010 453 | 6/1952 | |

* cited by examiner

Primary Examiner—Lynne H. Browne
Assistant Examiner—Michael P. Ferguson
(74) Attorney, Agent, or Firm—Guido Modiano; Albert Josif; Daniel O'Byrne

(57) ABSTRACT

A connecting element, particularly for connecting rear forks, also known as monostays, made of carbon to bicycle frames. The connecting element is constituted by a first insert and a second insert which are mutually detachably associable at a first end by way of mechanical connection element. The first and second inserts are respectively associated, at a second end, advantageously by way of adhesives, with the stem of a carbon monostay, and are associable with, or rigidly coupled to, a tubular extension of the frame.

12 Claims, 5 Drawing Sheets

US 6,626,604 B1

BICYCLE CONNECTING ELEMENT, PARTICULARLY FOR CONNECTING CARBON REAR FORKS TO FRAMES

BACKGROUND OF THE INVENTION

The present invention relates to a connecting element, particularly for connecting carbon monostays to bicycle frames.

Carbon front forks and rear monostays are currently increasingly used, in particular for competitive racing bicycles. This choice is due to the need to have bicycle frames which combine high rigidity with great lightness, and this need is effectively met by carbon-based materials.

When manufacturing frames, for example made of metallic alloys of steel or aluminum, it is necessary to deal with the problem of interconnecting a carbon element, the rear fork, and a metal element, i.e., the frame or a part thereof.

The prior art related to the use of carbon rear forks or monostays provides, as a solution to the described problem, for the use of adhesives betweeen the two parts, which are shaped appropriately so as to be mutually interlocked.

The disadvantage of this system is the fact that the connection, once provided, is permanent and the monostay or rear fork can no longer be removed from the frame.

In this manner, when necessary, for example for the replacement of one of the two components due to breakage or technical choice, it is not possible to separate the monostay and the frame.

SUMMARY OF THE INVENTION

The aim of the present invention is to solve the above problems, eliminating the drawbacks of the cited prior art, by providing an element which allows to use a non-permanent connection system thereby allowing the carbon monostay to be detachably connected to the frame. Within this aim, an important object of the present invention is to provide an element which allows to obtain a connection which adequately withstands the stresses applied during sports practice.

Another object is to provide an element which maintains the rigidity and low-weight characteristics of the carbon rear fork or monostay.

Another object is to provide an element which is structurally simple and has low manufacturing costs.

This aim and these and other objects which will become better apparent hereinafter are achieved by a connecting element, particularly for connecting rear forks, also known as monostays, made of carbon to bicycle frames, characterized in that it comprises a first insert and a second insert which are mutually detachably associable at a first end by way of a mechanical connection means, said first and second inserts being respectively associated, at a second end, advantageously by way of adhesives, with the stem of said carbon monostay, and being associable with, or rigidly coupled to, a tubular extension of said frame.

BRIEF DESCRIPTION OF THE DRAWINGS

Further characteristics and advantages of the invention will become better apparent from the following detailed description of a particular embodiment thereof, illustrated only by way of non-limitative example in the accompanying drawings, wherein.

DESCRIPTION OF THE PREFERRED EMBODIMENTS

Figure 1:
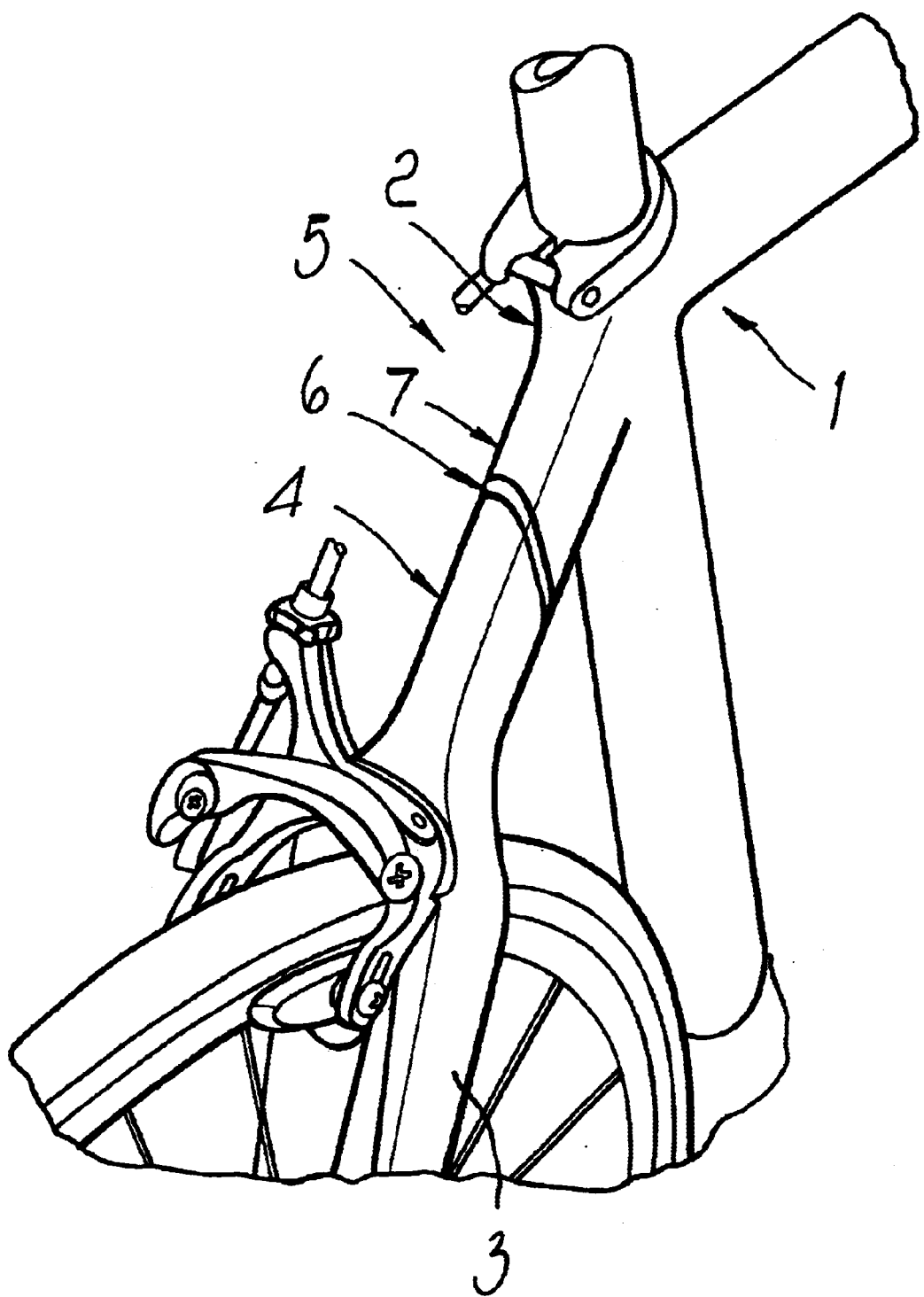
FIG. 1 is a perspective view of a detail of a bicycle frame with a monostay connected by means of the connecting element according to the present invention.
Figure 2:
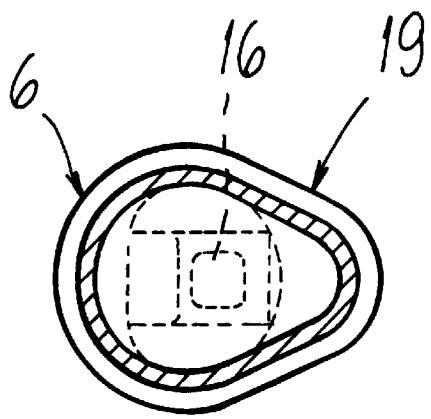
FIG. 2 is a first transverse sectional view of the first insert.
Figure 3:
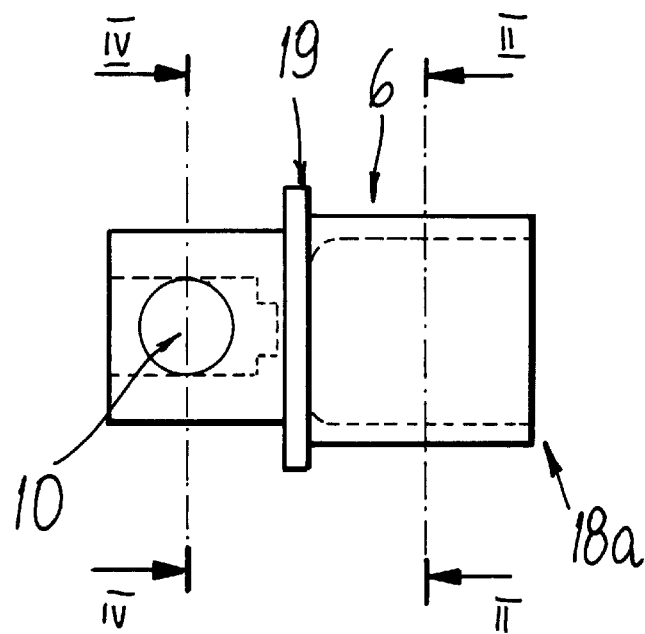
FIG. 3 is a front view of a first insert.
Figure 4:
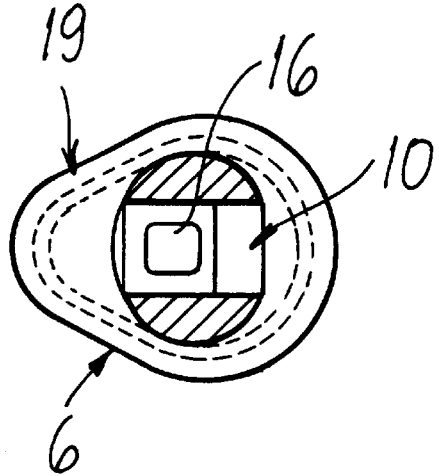
FIG. 4 is a second transverse sectional view of the first insert.
Figure 5:
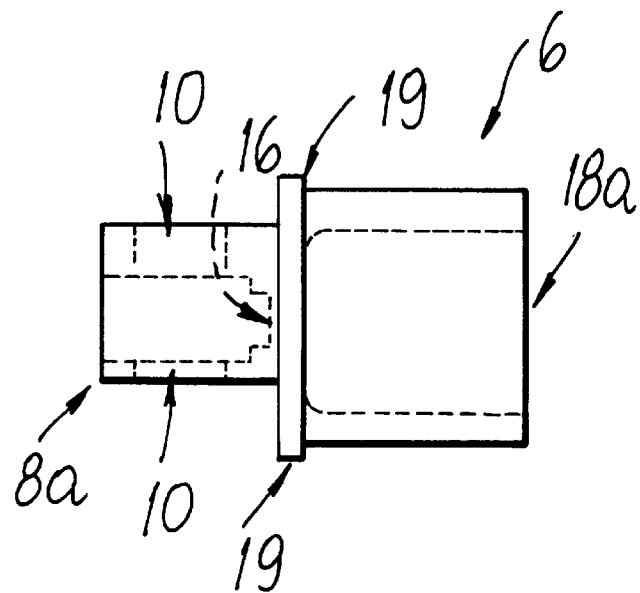
FIG. 5 is a side view of the first insert.
Figure 8:
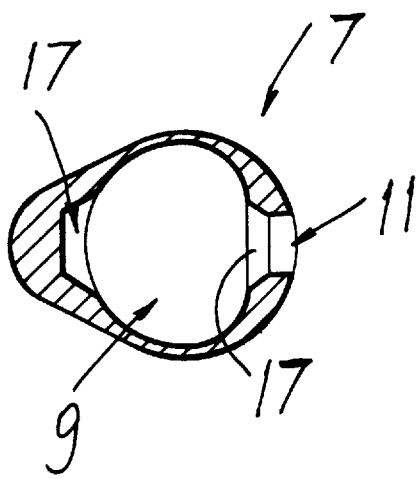
FIG. 8 is a second transverse sectional view of the second insert.
Figure 6:
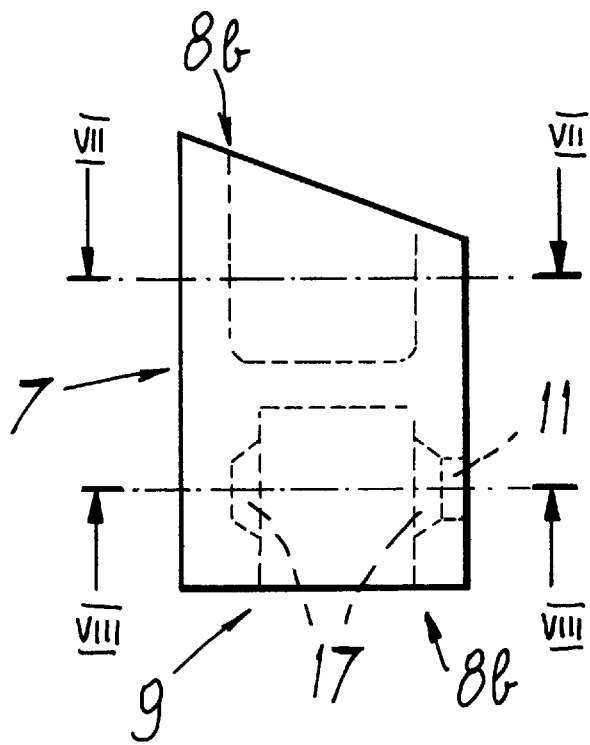
FIG. 6 is a side view of a second insert.
Figure 7:
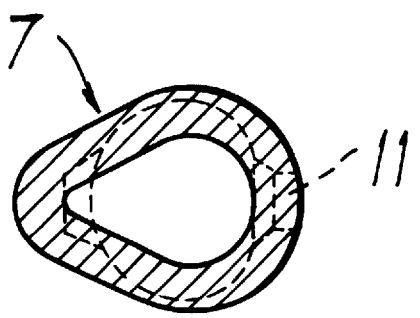
FIG. 7 is a first transverse sectional view of the second insert.
Figure 9:
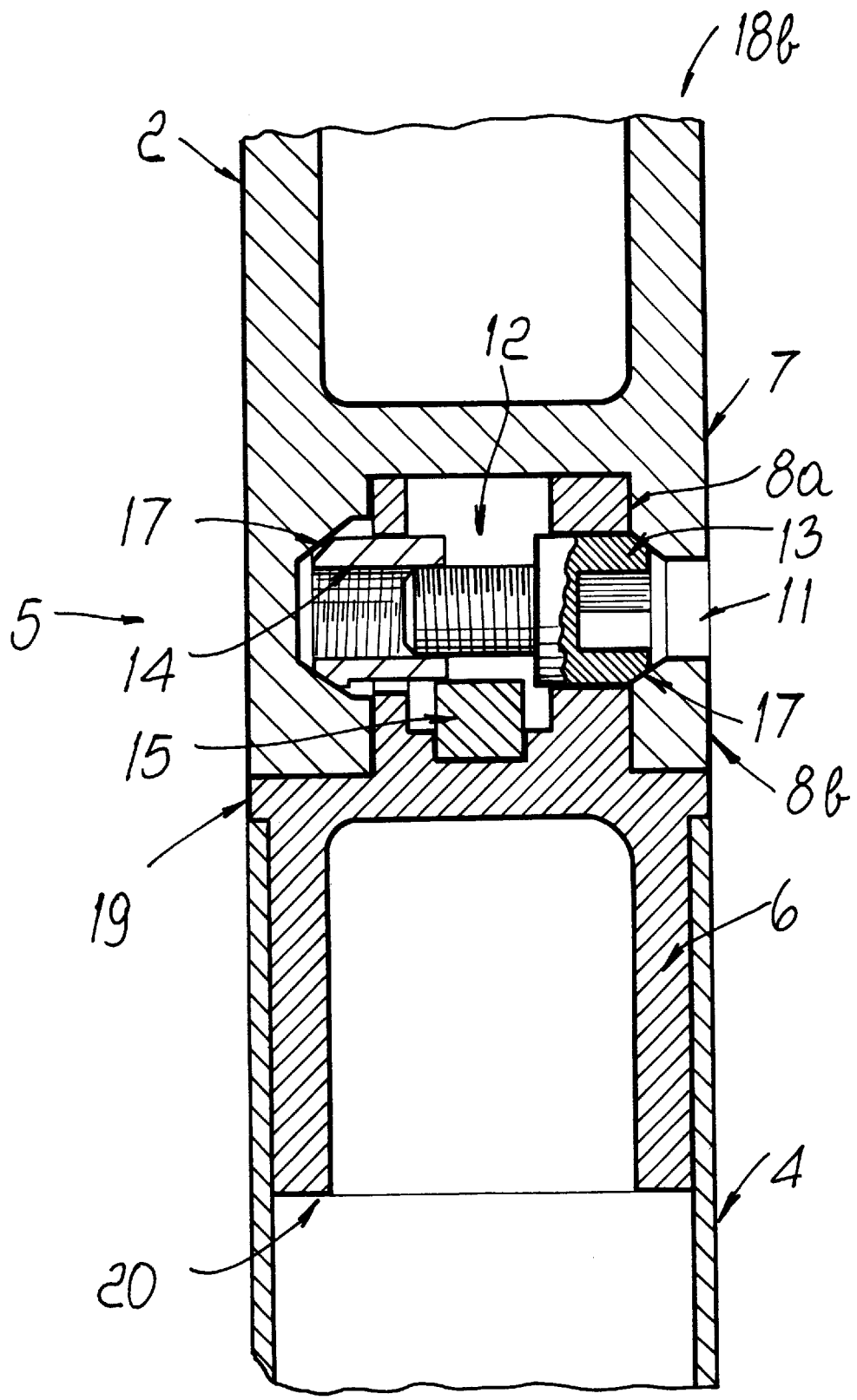
FIG. 9 is a lateral sectional view of the invention.
Figure 10:
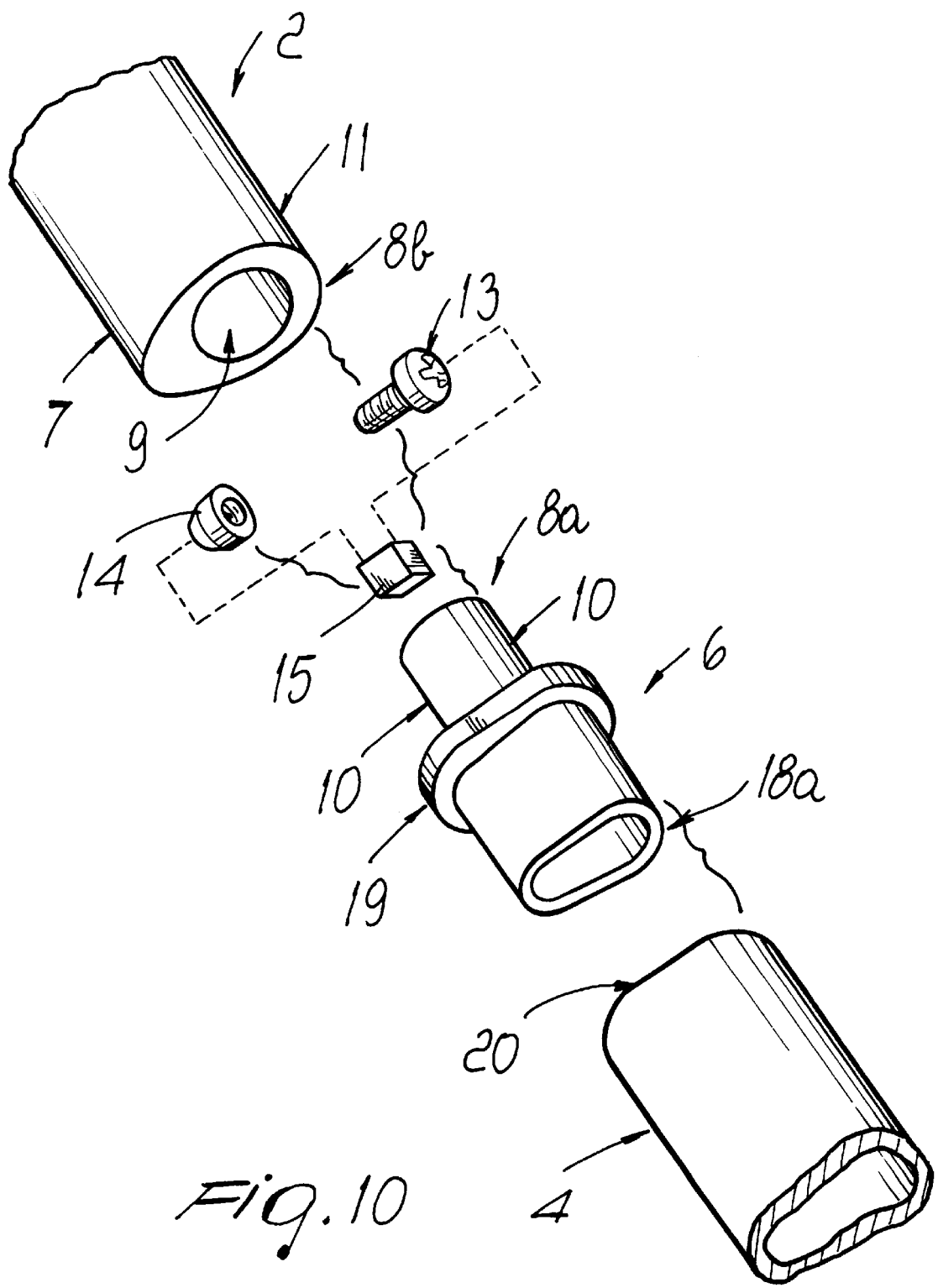
FIG. 10 is an exploded view of the invention.

With reference to the figures, the reference numeral 1 designates a bicycle frame, advantageously made of metallic materials, particularly alloys of steel or aluminum.

Said frame has, beneath and behind the saddle, toward the hub of a rear wheel, a tubular extension 2 which is internally hollow and is advantageously circular, oval or teardrop-shaped.

A monostay, designated by the reference numeral 3 and made of carbon, is to be applied to said frame 1 and has, in an upward region, a stem 4 for connection to a pair of lateral wings for connection to the hub of the wheel. For the removable connection between said stem 4 and said tubular extension 2, a connecting element, designated by the reference numeral 5 is used, which is constituted by a first insert 6 and a second insert 7 which are advantageously made of metal and have, in a transverse cross-section, a perimetric shape which is similar to the perimetric shape of said tubular extension 2 or another appropriate shape according to requirements.

The first insert 6 and second insert 7 are detachably associable with each other at a first end, designated by the reference numerals 8a and 8b respectively.

The first end 8b of said second insert 7 has a first axial seat, designated by the reference numeral 9, which is shaped complementarily to said first end 8a of said first insert 6, for the insertion thereof and its subsequent detachable coupling.

A first circular through hole 10 is provided radially with respect to the lateral surface of said first end 8a and is suitable for the passage of appropriate means for mechanical connection between said first insert 6 and said second insert 7.

The first end 8b also is radially provided with a second hole, designated by the reference numeral 11, which is coaxial to said first hole 10 but has a smaller diameter than said first hole and is not a through hole.

In this manner it is possible to position, inside said first hole 10, a bolt, designated by the reference numeral 12, which is composed of a screw 13 and a nut 14, which interact with a registration pin 15 which is positioned beforehand inside said first end 8a, at a suitable second seat which is designated by the reference numeral 16 and is formed at the longitudinal central axis.

The registration pin 15 is advantageously designed to prevent the rotation of said nut 14 with respect to said screw 13.

The head of said screw 13 is wider than the diameter of said second hole 11, so that once said first end 8a has been inserted in said first seat 9 of said first end 8b, the activation of the head of said bolt 12 causes an axial movement, in opposite directions, of said screw 13 and said nut 14.

The free ends of said screw 13 and said nut 14 rest and abut against facing and complementarily shaped walls 17 which are internal to said first end 8b of said second insert 7; this entails the mutual locking of the two components.

The first insert 6 and the second insert 7 have, in opposite positions with respect to the respective first ends 8a and 8b, second ends which are respectively designated by the reference numerals 18a and 18b.

The second end 18a has a larger cross-section than said first end 8a, which is connected thereto by means of a wing, designated by the reference numeral 19, which advantageously has the same shape and dimensions as the outer surface of the stem 4 of said monostay 3.

The stem 4 has, in its end part, a third axial seat, designated by the reference numeral 20, inside which it is possible to insert, advantageously by gluing, said second end 18a, whose outside diameter is approximately equal to the inside diameter of said third seat.

If allowed by the materials, said tubular extension 2 is appropriately rigidly coupled to said second insert 7 by stable connection or by casting during the manufacture of the frame.

Use of the connecting element according to the present invention is therefore as follows: with reference to FIG. 1, the reference numeral 1 designates a frame which has a tubular extension 2 which is advantageously rigidly coupled, for example during casting, to a second insert 7.

A first insert 6 is inserted, advantageously with the application of adhesive, in the third seat 20 formed in a monostay 3 of a frame 1, so that the wing 19 abuts against the edge of said monostay.

A registration pin 15 is then placed in the appropriate second seat 16 formed inside the first end 8a of said first insert 6.

The registration pin is designed to support a bolt 12 during the insertion thereof in a first hole 10 formed in the first end 8a of said first insert 6.

After arranging the first insert 6 so that said first end 8a enters a first seat 9 formed in said second insert 7, one acts through a second hole 11, formed in said second insert, so as to partially unscrew the screw 13 from the nut 14 of said bolt 12.

This process causes said screw 13 and said nut 14 to press on the respective inside walls 17 of the second insert 7, with the consequent detachable mutual coupling of the two inserts and therefore of the metal frame and the carbon monostay.

It has thus been observed that the invention has achieved the intended aim and objects, a connecting element for detachable connection between a metal bicycle frame and a carbon monostay having been provided.

The invention is of course susceptible of numerous modifications and variations, all of which are within the scope of the same inventive concept.

The materials used, as well as the dimensions that constitute the individual components of the invention, may of course be more pertinent according to specific requirements.

The disclosures in Italian Patent Application No. TV99A000131 from which this application claims priority are incorporated herein by reference.

What is claimed is:

1. A bicycle frame with a detachable carbon monostay, comprising:

a tubular extension provided at said fame;

a stem provided at said monostay;

a connecting element constituted by a first insert and by a second insert each having respective first and, opposite, second ends thereof;

mechanical connection means actuatable for detachably connecting and locking said first ends of said inserts to each other, and a first axial, shaped seat, provided at one of the first ends of said first and second inserts, said shaped seat being shaped complementarily to the other one of the first ends of said first and second inserts, said first and second inserts being connected to each other by axial insertion of said other one of the first ends of the first and second inserts in said shaped seat provided at said one of said first ends of the first and second inserts and mutually locked by actuation of said connection means, the second end of said first insert being rigidly coupled with the stem of the carbon monostay, and the second end of the second insert being rigidly coupled to the tubular extension of the frame, said first insert being further provided with a first, transversal, circular through hole arranged at a lateral surface of said first end thereof for passage of said mechanical connection means and said first end of said second insert being provided with a second, transversal, blind hole which is coaxial to said fist hole and has a smaller diameter than said first hole.

2. A bicycle fame with a detachable carbon monostay, comprising:

a tubular extension provided at said frame;

a stem provided at said monostay;

a connecting element constituted by first and second tubular inserts each having respective first and, opposite, second ends thereof;

mechanical connection means actuatable for detachably connecting and locking said first ends of said inserts to each other;

a shaped seat provided at the first end of, and formed by an inside wall of said second insert, said shaped seat being shaped complementarily to the first end of said first insert, the second end of said first insert being rigidly coupled with the stem of the carbon monostay, and the second end of the second insert being rigidly coupled to the tubular extension of the frame; and a first through hole crossing transversally the first end of said first insert and wherein said first and second inserts are connected to each other by axial insertion of the fiat end of the first insert in said shaped seat provided at the first end of the second insert,d mutually locked by way of said connection means which are actuated to so as to engage in said first through hole of said first insert and press on the inside wall of said second insert.

3. The frame with a detachable carbon monostay of claim 2, wherein said first insert and second insert have, in a transverse cross-section, a perimetric shape similar to the perimetric shape of said tubular extension.

4. The frame with a detachable carbon monostay of claim 2, wherein the second end of said fist insert is coupled with the stem of the carbon monostay by way of a suitable adhesive.

5. The frame with a detachable carbon monostay of claim 2, wherein said fist end of said second insert is provided with a second, transversal, blind hole which is coaxial to said fist hole and has a smaller diameter than said first hole.

6. The frame with a detachable carbon monostay of claim 5, further comprising: a second seat located inside said first end of said first insert and formed at a longitudinal central axis of the first insert, and a registration pin positioned in said second seat.

7. The frame with a detachable carbon monostay of claim 6, wherein said connecting means consist of a bolt, which is composed of a screw and a nut, and is insertable in said first hole so as to interact with said registration pin.

8. The frame with a detachable carbon monostay of claim 7, wherein said screw has a head which is wider than a diameter of said second blind hole, so that upon insertion of said first insert in said second insert, said head and said nut rest on facing and complementarily shaped inside walls of said first end of said second insert.

9. The frame with a detachable carbon monostay of claim 8, wherein upon actuation of said head through said second blind hole said connection means are locked by an axial movement in opposite directions of said screw and said nut until the respective free ends thereof abut against facing side walls of said second insert.

10. The frame with a detachable carbon monostay of claim 6, comprising a third axial seat in an end part of said stem of said monostay, said second end of said first insert being coupled by gluing in said third seat and having an outside diameter which is substantially equal to an inside diameter of said third seat.

11. The frame with a detachable carbon monostay of claim 2, wherein said second end of said first insert is provided with a wing that has a larger cross-section than the first end of the fist insert said wing having shape and dimensions identical to those of an outer surface of said tubular extension.

12. The frame with a detachable carbon monostay of claim 2, wherein said tubular extension is rigidly coupled to said second end of said second insert by any of a stable connection or casting during frame manufacture.

* * * * *